(12) United States Patent
Kanai

(10) Patent No.: US 9,372,335 B2
(45) Date of Patent: Jun. 21, 2016

(54) FINDER OPTICAL SYSTEM

(71) Applicant: RICOH IMAGING COMPANY, LTD., Tokyo (JP)

(72) Inventor: Moriyasu Kanai, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/521,579

(22) Filed: Oct. 23, 2014

(65) Prior Publication Data

US 2015/0116823 A1  Apr. 30, 2015

(30) Foreign Application Priority Data

Oct. 25, 2013  (JP) .................................. 2013-221758

(51) Int. Cl.
| | |
|---|---|
| G02B 23/00 | (2006.01) |
| G02B 9/12 | (2006.01) |
| G02B 13/18 | (2006.01) |
| G03B 13/06 | (2006.01) |
| G02B 25/00 | (2006.01) |

(52) U.S. Cl.
CPC ............... G02B 23/145 (2013.01); G02B 9/12 (2013.01); G02B 13/18 (2013.01); G02B 25/001 (2013.01); G03B 13/06 (2013.01)

(58) Field of Classification Search
CPC ........ G02B 23/145; G02B 9/12; G02B 13/18; G02B 13/06
USPC .................... 359/422, 432, 645; 396/379, 382
See application file for complete search history.

(56) References Cited

U.S. PATENT DOCUMENTS

| | | | | | |
|---|---|---|---|---|---|
| 5,173,806 | A | * | 12/1992 | Ogata | G02B 15/177 359/683 |
| 5,257,129 | A | * | 10/1993 | Morooka | G02B 15/16 359/432 |
| 5,323,264 | A | * | 6/1994 | Kato | G02B 15/177 359/431 |
| 5,448,400 | A | * | 9/1995 | Kikuchi | G02B 15/173 359/422 |
| 5,717,521 | A | * | 2/1998 | Kim | G03B 13/12 359/380 |
| 6,253,033 | B1 | * | 6/2001 | Hasushita | G02B 15/177 359/645 |
| 6,263,168 | B1 | | 7/2001 | Hasushita et al. | |
| 6,272,294 | B1 | | 8/2001 | Abe | |
| 6,282,022 | B1 | | 8/2001 | Abe | |

(Continued)

FOREIGN PATENT DOCUMENTS

| | | |
|---|---|---|
| JP | 2000-171731 | 6/2000 |
| JP | 2001-100115 | 4/2001 |
| JP | 2001-311881 | 11/2001 |
| JP | 2001-324684 | 11/2001 |
| JP | 2007-322967 | 12/2007 |
| JP | 2007-322968 | 12/2007 |
| JP | 2007-328160 | 12/2007 |
| JP | 2008-129059 | 6/2008 |

*Primary Examiner* — Frank Font
(74) *Attorney, Agent, or Firm* — Greenblum & Bernstein P.L.C.

(57) ABSTRACT

A finder optical system includes an image inverter optical member and an eyepiece lens system. The eyepiece lens system includes a first lens element, a positive biconvex second lens element, and a meniscus third lens element having a concave surface on the eyepoint side, in that order from the object side. A diopter adjustment operation is performed by moving the second lens element along the optical axis. Conditions (1) and (2) are satisfied:

$$-0.2 < f/f3 < 0.2 \quad (1), \text{ and}$$

$$2.15 < f(L3n-1)/L3b < 3.00 \quad (2),$$

wherein f designates the focal length of the entire the eyepiece lens system at a diopter of −1, f3 designates the focal length of the third lens element, L3n designates the refractive index at the d-line of the third lens element, and L3b designates the radius of curvature of the surface on the eyepoint side of the third lens element.

20 Claims, 12 Drawing Sheets

(56) References Cited

U.S. PATENT DOCUMENTS

| | | | | |
|---|---|---|---|---|
| 6,804,462 B2* | 10/2004 | Ogata | G03B 19/12 359/345 |
| 7,391,968 B2* | 6/2008 | Takato | G02B 25/001 359/345 |
| 2002/0176175 A1* | 11/2002 | Kamo | G02B 17/0848 359/645 |
| 2007/0286594 A1* | 12/2007 | Matsuda | G03B 13/06 396/382 |
| 2007/0297787 A1* | 12/2007 | Arai | G03B 19/12 396/382 |
| 2008/0130127 A1* | 6/2008 | Oshita | G02B 25/001 359/645 |
| 2009/0097128 A1* | 4/2009 | Yokoyama | G02B 25/001 359/645 |
| 2009/0262434 A1* | 10/2009 | Yokoyama | G03B 13/06 359/645 |

\* cited by examiner

Fig. 1
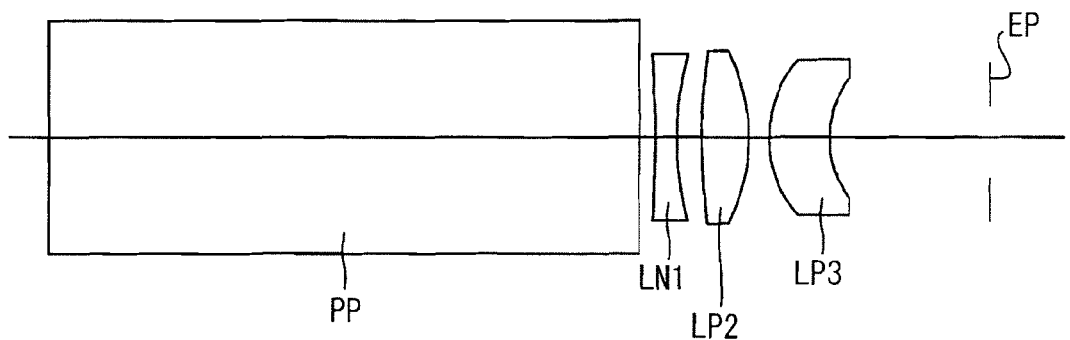
Fig. 2A  Fig. 2B  Fig. 2C  Fig. 2D
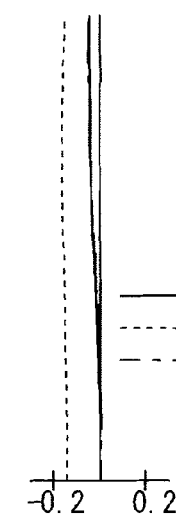
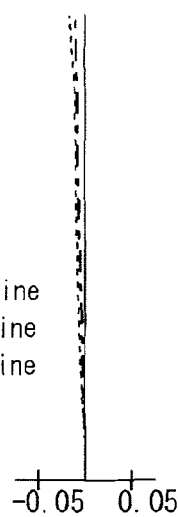
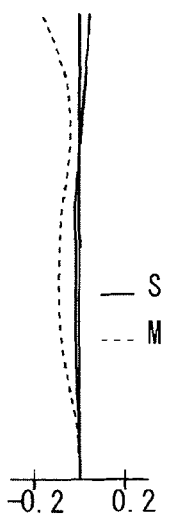
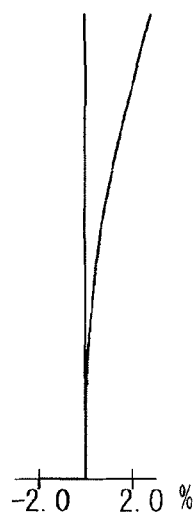

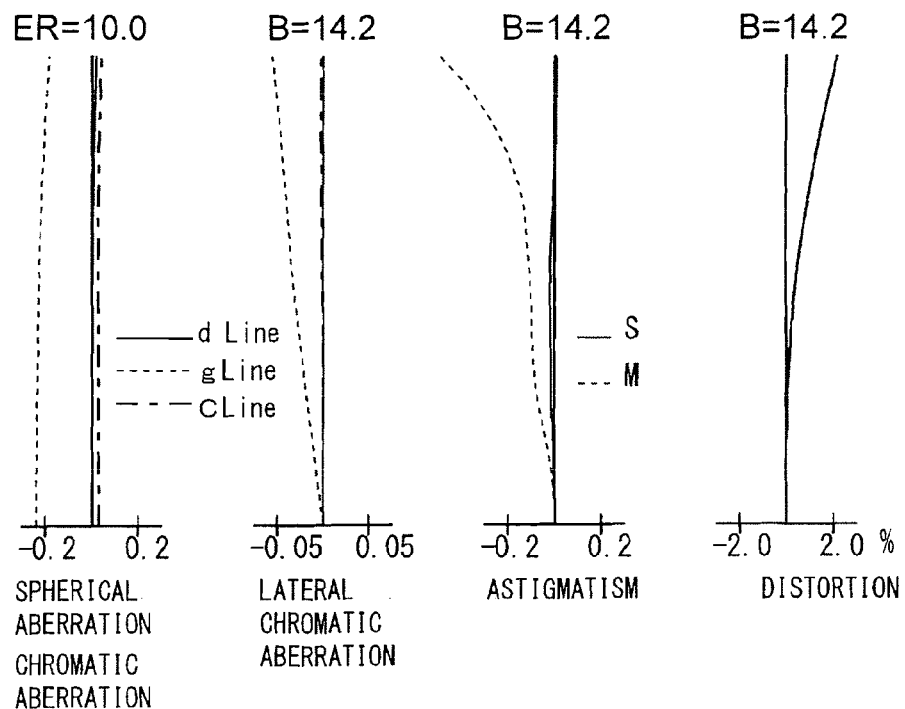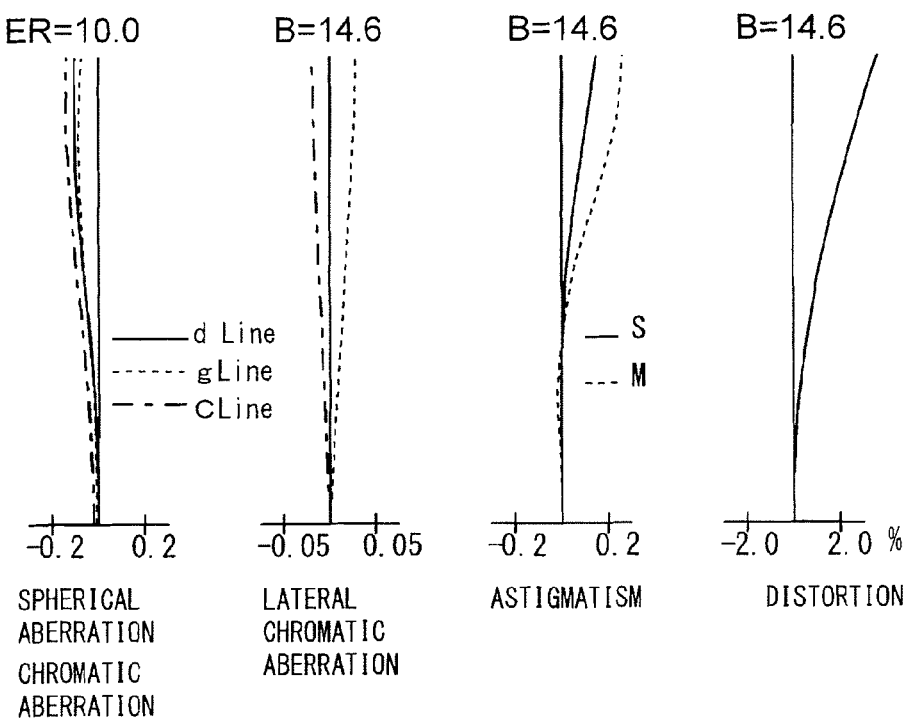

ER=10.0

—— d Line
------ g Line
— — — C Line

-0.2  0.2
SPHERICAL
ABERRATION
CHROMATIC
ABERRATION

B=14.4

-0.05  0.05
LATERAL
CHROMATIC
ABERRATION

B=14.4

—— S
--- M

-0.2  0.2
ASTIGMATISM

B=14.4

-2.0  2.0 %
DISTORTION

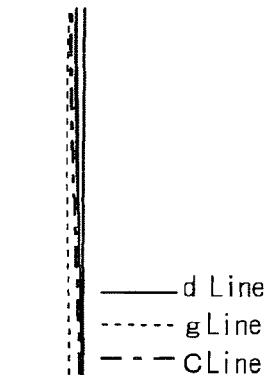
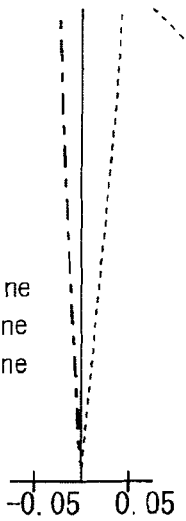
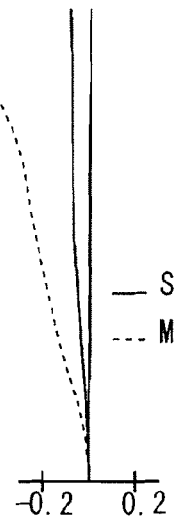
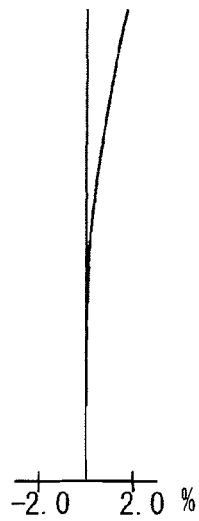
Fig. 7A  Fig. 7B  Fig. 7C  Fig. 7D
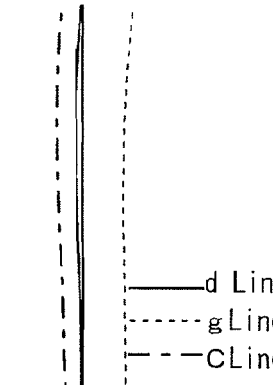
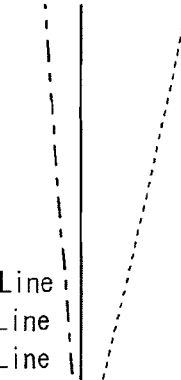
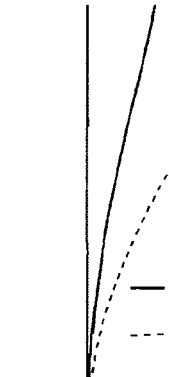
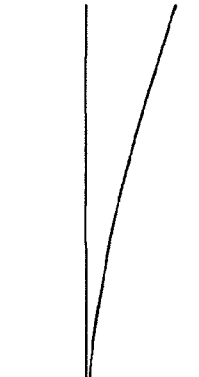
Fig. 8A  Fig. 8B  Fig. 8C  Fig. 8D

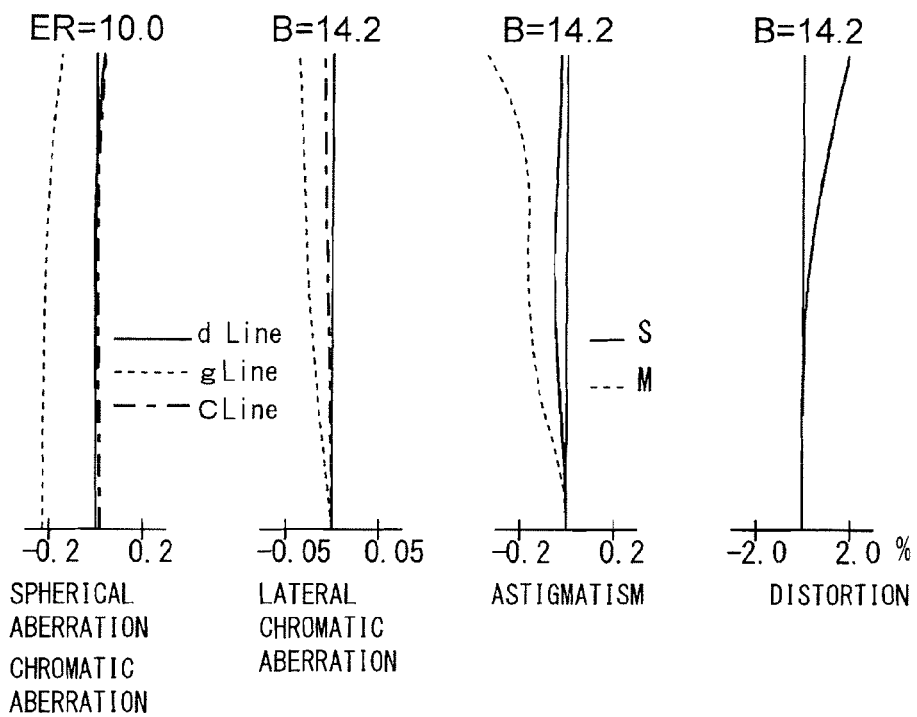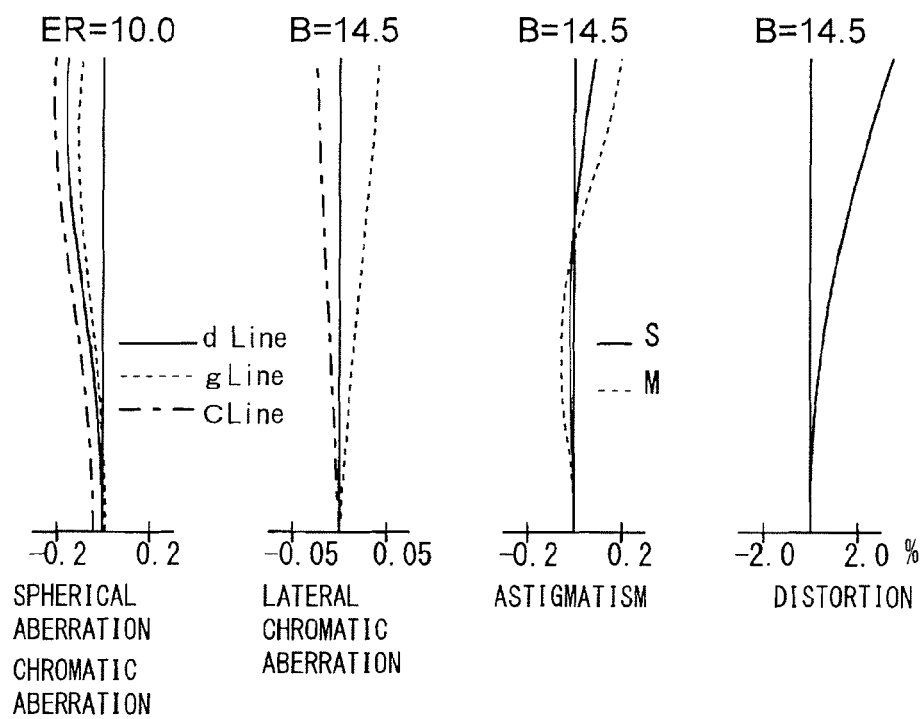

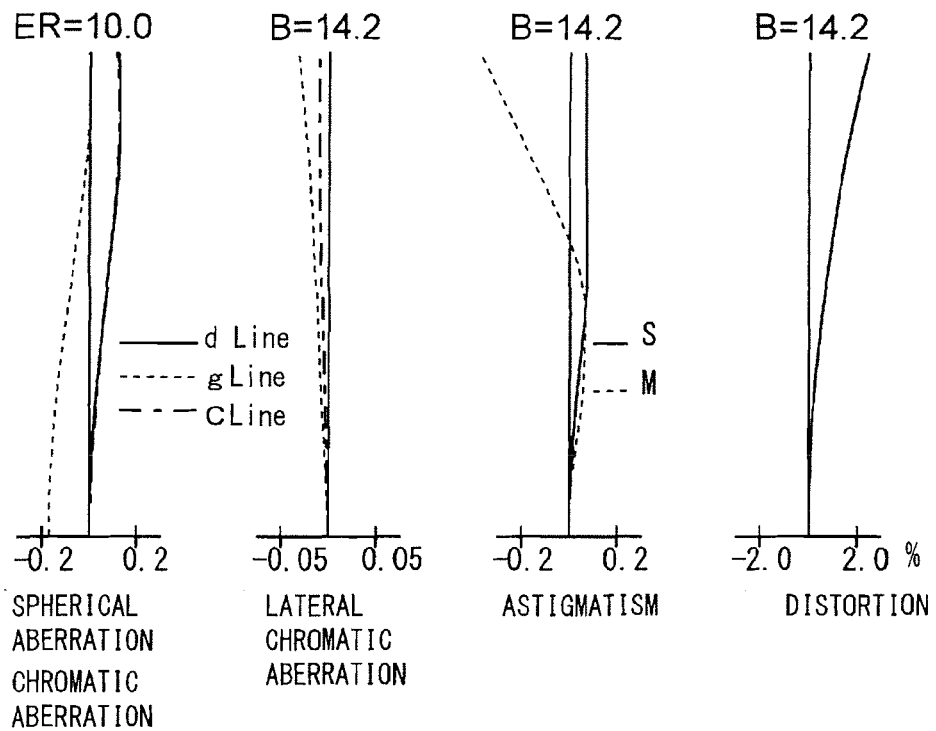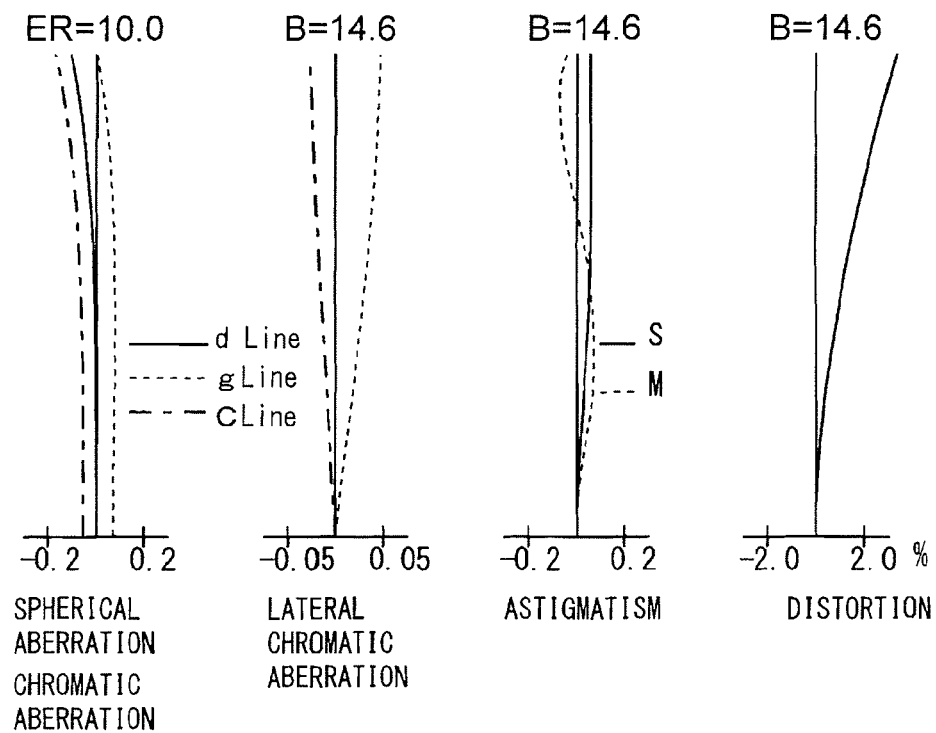

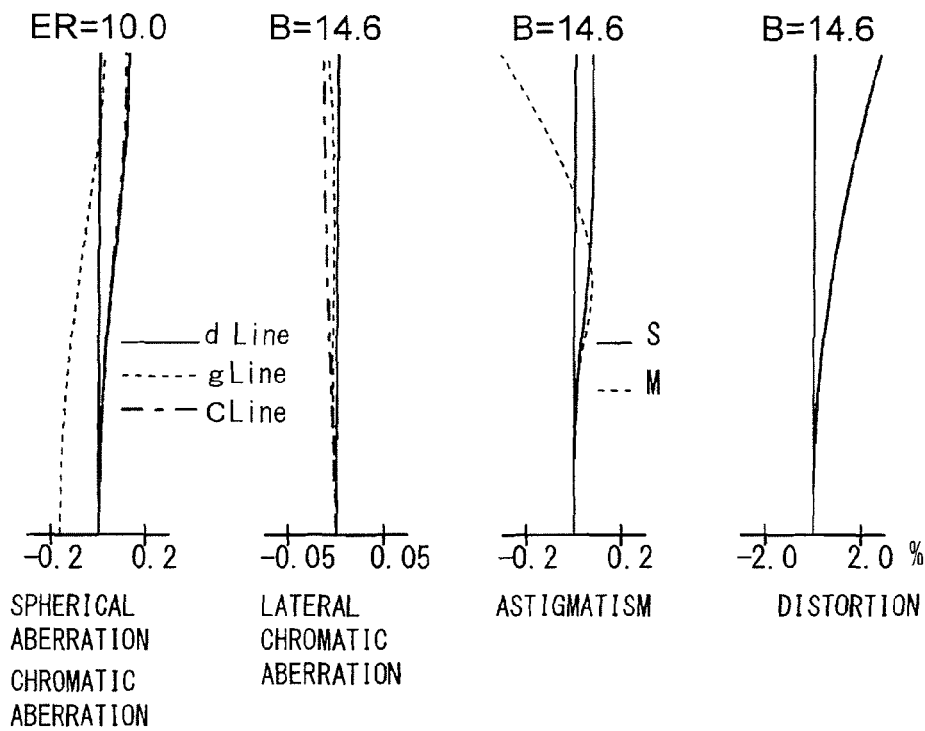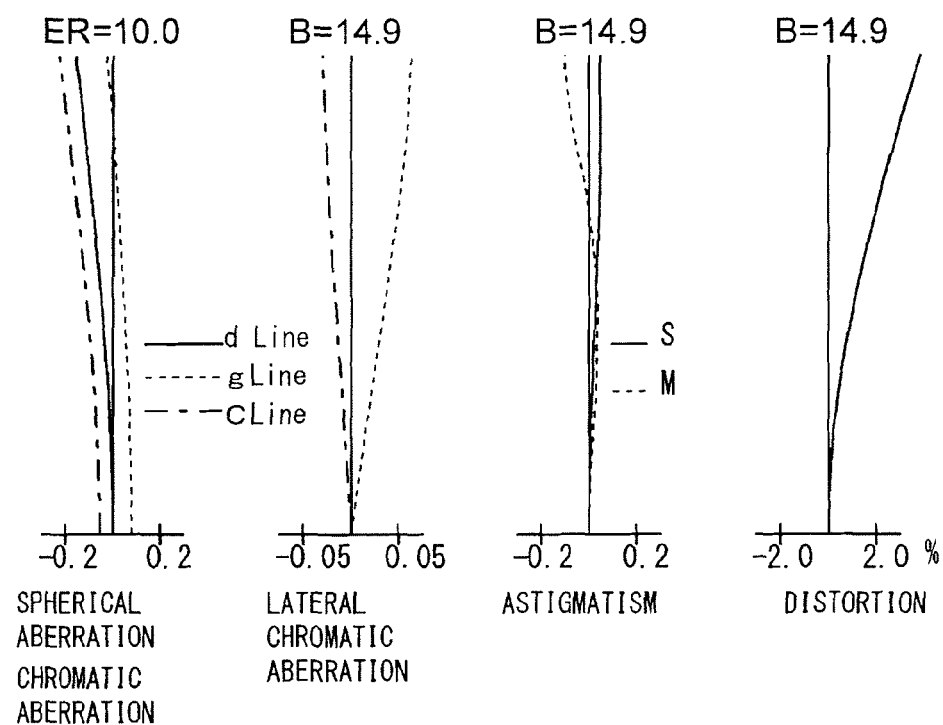

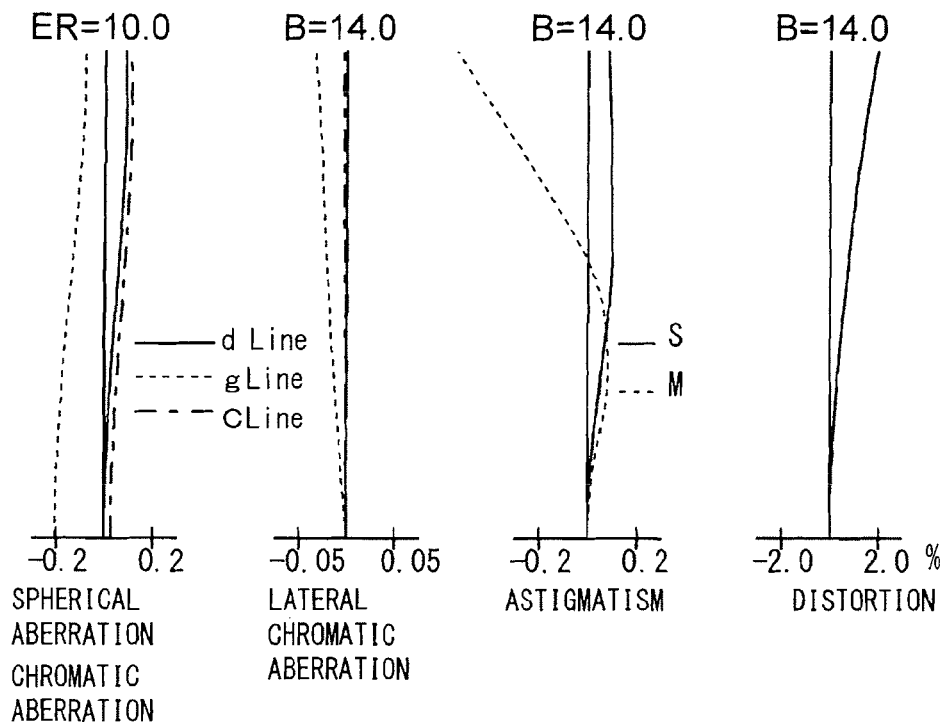
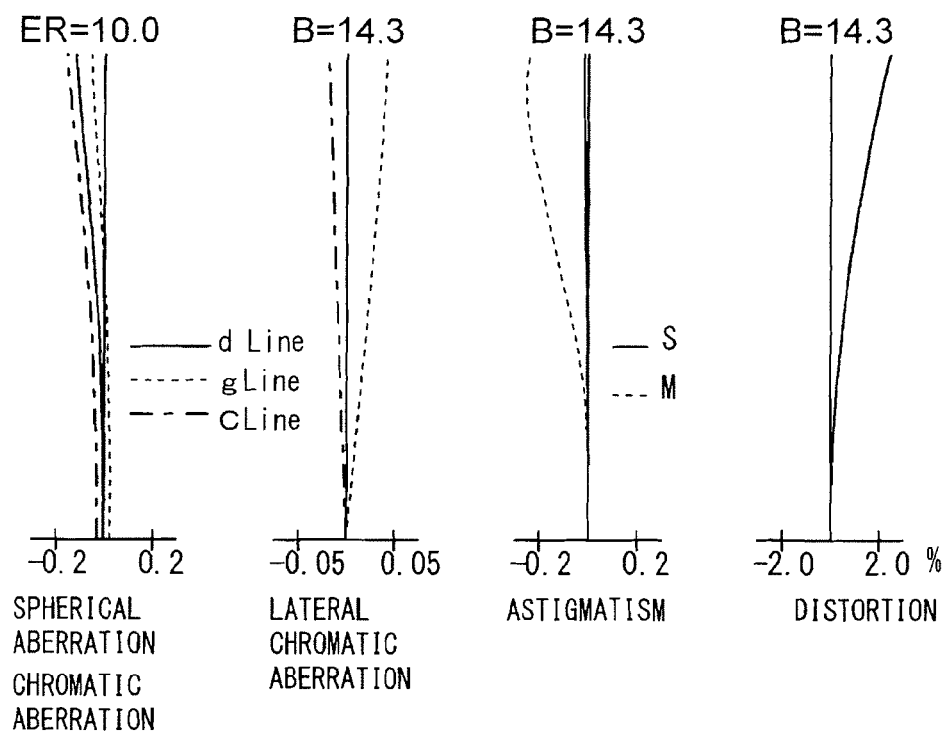

FINDER OPTICAL SYSTEM

BACKGROUND OF THE INVENTION

1. Field of the Invention

The present invention relates to a finder optical system provided in a photographic apparatus, e.g., a single lens reflex camera.

2. Description of Related Art

A finder optical system of a single lens reflex camera is configured to form (at the eyepoint) an enlarged image of an object image that is formed through a photographing lens system, formed onto a focal plane plate and inverted to produce an erected image via an image inverter optical member, such as a pentaprism, etc., for a user to view via an eyepiece lens system.

An eyepiece lens system that is used in such a finder optical system is required to have a high observation magnification, is required to ensure a sufficient eye relief (the distance between the eyepoint and the apex of the outermost surface on the eyepoint side of the eyepiece optical system), and the diopter is required to be adjustable, etc.

Since the eye relief is restricted by the size of the exit surface of the image inverter optical member, such as a pentaprism, etc., the eye relief typically cannot be made very long if attempts are made to obtain a high observation magnification. Accordingly, such a restriction in eye relief is disadvantageous for users wearing glasses in particular, who require a long eye relief.

Hence, there have been various kinds of finder optical systems proposed which provide a diopter adjustment function so that a favorable (in-focus) finder image can be observed by a user (who normally wears glasses) with his/her glasses removed. For example, in Japanese Unexamined Patent Publication Nos. 2001-324684 and 2007-328160, finder optical systems are disclosed in which the eyepiece optical systems thereof are configured of three lens elements, i.e., either a negative lens element, a positive lens element and a negative lens element, in that order from the object side, or a negative lens element, a positive lens element and a positive lens element, in that order from the object side, in which a diopter adjustment is carried out by moving the middle positive lens elements, each of which serves as a diopter adjustment lens element, in a direction along the optical axis thereof.

However, in the finder optical systems disclosed in Japanese Unexamined Patent Publication Nos. 2001-324684 and 2007-328160, since the amount of change in diopter relative to the movement amount of the diopter adjustment lens element (middle positive lens element) is small, a sufficient diopter adjustment range cannot be obtained. Furthermore, if attempts are made to forcedly increase the diopter adjustment range by increasing the movement amount of the diopter adjustment lens element, aberration fluctuations increase, thereby deteriorating the optical quality.

SUMMARY OF THE INVENTION

In view of the above-discussed problems, the present invention provides a finder optical system which achieves a high observation magnification, obtains a large diopter adjustment range with a small movement amount of the diopter adjustment lens element while having a simple configuration, and favorably corrects the various aberrations while achieving a superior optical quality.

According to an aspect of the present invention, a finder optical system is provided, including an image inverter optical member, which inverts an object image to form an erected object image, and an eyepiece lens system which forms an enlarged image of the erected object image at an eyepoint. The eyepiece lens system includes a first lens element, a positive biconvex second lens element, and a meniscus third lens element having a concave surface on the eyepoint side, in that order from the image inverter optical member side and toward the eyepoint. A diopter adjustment operation is carried out by moving the second lens element in a direction along the optical axis thereof. Conditions (1) and (2) are satisfied:

$$-0.2 < f/f3 < 0.2 \quad (1), \text{ and}$$

$$2.15 < f(L3n-1)/L3b < 3.00 \quad (2),$$

wherein f designates the focal length of the entire the eyepiece lens system at a diopter of $-1$, f3 designates the focal length of the third lens element, L3n designates the refractive index at the d-line of the third lens element, and L3b designates the radius of curvature of the surface on the eyepoint side of the third lens element.

Out of the range specified by condition (2), it is desirable for the following condition (2') to be satisfied:

$$2.15 < f(L3n-1)/L3b < 2.90 \quad (2').$$

It is desirable for the following condition (3) to be satisfied:

$$1.15 < \{L3b/(L3n-1) + L3d/L3n\}/\{L3b/(L3n-1)\} < 1.30 \quad (3),$$

wherein L3n designates the refractive index at the d-line of the third lens element, L3b designates the radius of curvature of the surface on the eyepoint side of the third lens element, and L3d designates the lens thickness of the third lens element.

Out of the range specified by condition (3), it is desirable for the following condition (3') to be satisfied:

$$1.15 < \{L3b/(L3n-1) + L3d/L3n\}/\{L3b/(L3n-1)\} < 1.23 \quad (3').$$

It is desirable for the following condition (4) to be satisfied:

$$-1.5 < f/f1 < -1.1 \quad (4),$$

wherein f designates the focal length of the entire the eyepiece lens system at a diopter of $-1$, and f1 designates the focal length of the first lens element.

Out of the range specified by condition (4), it is desirable for the following condition (4') to be satisfied:

$$-1.4 < f/f1 < -1.1 \quad (4').$$

In an embodiment a finder optical system is provided, including an image inverter optical member, which inverts an object image to form an erected object image; and an eyepiece lens system which forms an enlarged image of the erected object image at an eyepoint. The eyepiece lens system includes a negative first lens element, a positive biconvex second lens element, and a meniscus third lens element having a concave surface on the eyepoint side, in that order from the image inverter optical member side and toward the eyepoint. A diopter adjustment operation is carried out by moving the second lens element in a direction along the optical axis thereof. Conditions (1) and (3) are satisfied:

$$-0.2 < f/f3 < 0.2 \quad (1), \text{ and}$$

$$1.15 < \{L3b/(L3n-1) + L3d/L3n\}/\{L3b/(L3n-1)\} < 1.30 \quad (3),$$

wherein f designates the focal length of the entire the eyepiece lens system at a diopter of $-1$, f3 designates the focal length of the third lens element, L3n designates the refractive index at the d-line of the third lens element, L3b designates the radius of curvature of the surface on the eyepoint side of the third lens element, and L3d designates the lens thickness of the third lens element.

In an embodiment, a finder optical system is provided, including an image inverter optical member, which inverts an object image to form an erected object image; and an eyepiece lens system which forms an enlarged image of the erected object image at an eyepoint. The eyepiece lens system includes a negative first lens element, a positive biconvex second lens element, and a meniscus third lens element having a concave surface on the eyepoint side, in that order from the image inverter optical member side and toward the eyepoint. A diopter adjustment operation is carried out by moving the second lens element in a direction along the optical axis thereof. Conditions (1) and (4) are satisfied:

$$-0.2 < f/f3 < 0.2 \quad (1), \text{ and}$$

$$-1.5 < f/f1 < -1.1 \quad (4),$$

wherein f designates the focal length of the entire the eyepiece lens system at a diopter of −1, f1 designates the focal length of the first lens element, and f3 designates the focal length of the third lens element.

It is desirable for the first lens element to include an aspherical surface on at least the object side thereof, and the second lens element to include an aspherical surface on the object side thereof, and the third lens element to include an aspherical surface on the object side thereof.

According to the present invention, a finder optical system can be obtained, which achieves a high observation magnification, obtains a large diopter adjustment range with a small movement amount of the diopter adjustment lens element while having a simple configuration, and favorably corrects the various aberrations while achieving a superior optical quality.

The present disclosure relates to subject matter contained in Japanese Patent Application No. 2013-221758 (filed on Oct. 25, 2013) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first numerical embodiment, according to the present invention, of a finder optical system when the diopter value is −1;

FIGS. 2A, 2B, 2C and 2D show various aberrations of the finder optical system, having the lens arrangement of FIG. 1, when the diopter value is −1;

FIGS. 3A, 3B, 3C and 3D show various aberrations of the finder optical system, having the lens arrangement of FIG. 1, when the diopter value is −3.0;

FIGS. 4A, 4B, 4C and 4D show various aberrations of the finder optical system, having the lens arrangement of FIG. 1, when the diopter value is +1.5;

FIGS. 7A, 7B, 7C and 7D show various aberrations of the finder optical system, having the lens arrangement of FIG. 5, when the diopter value is −3.1;

FIGS. 8A, 8B, 8C and 8D show various aberrations of the finder optical system, having the lens arrangement of FIG. 5, when the diopter value is +1.5;

FIGS. 11A, 11B, 11C and 11D show various aberrations of the finder optical system, having the lens arrangement of FIG. 9, when the diopter value is −3.1;

FIGS. 12A, 12B, 12C and 12D show various aberrations of the finder optical system, having the lens arrangement of FIG. 9, when the diopter value is +1.5;

FIGS. 15A, 15B, 15C and 15D show various aberrations of the finder optical system, having the lens arrangement of FIG. 13, when the diopter value is −3.0;

FIGS. 16A, 16B, 16C and 16D show various aberrations of the finder optical system, having the lens arrangement of FIG. 13, when the diopter value is +1.5;

FIGS. 19A, 19B, 19C and 19D show various aberrations of the finder optical system, having the lens arrangement of FIG. 17, when the diopter value is −3.0;

FIGS. 20A, 20B, 20C and 20D show various aberrations of the finder optical system, having the lens arrangement of FIG. 17, when the diopter value is +1.5;

FIGS. 23A, 23B, 23C and 23D show various aberrations of the finder optical system, having the lens arrangement of FIG. 21, when the diopter value is −3.0; and FIGS. 24A, 24B, 24C and 24D show various aberrations of the finder optical system, having the lens arrangement of FIG. 21, when the diopter value is +1.5.

DESCRIPTION OF EMBODIMENTS

Figure 5:
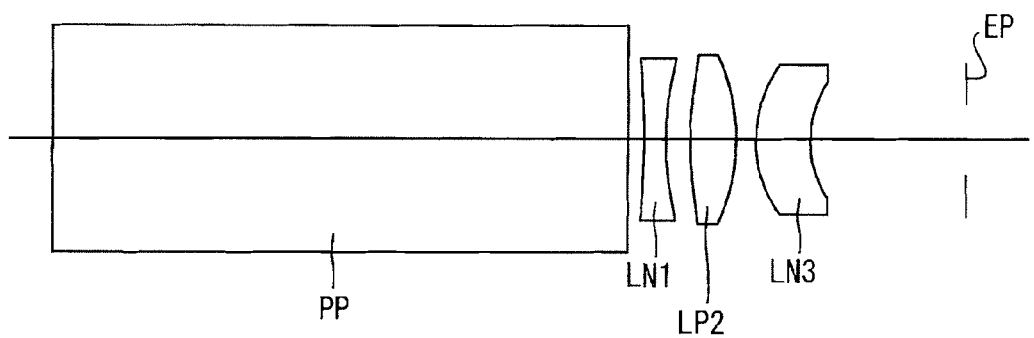
FIG. 5 shows a lens arrangement of a second numerical embodiment, according to the present invention, of a finder optical system when the diopter value is −1.
Figure 6A:
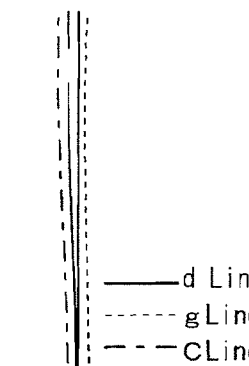
FIGS. 6A, 6B, 6C and 6D show various aberrations of the finder optical system, having the lens arrangement of FIG. 5, when the diopter value is −1.
Figure 6B:
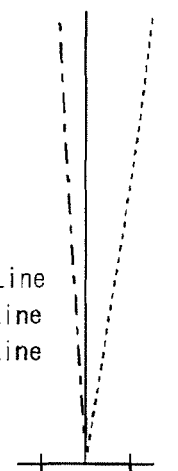
Figure 6C:
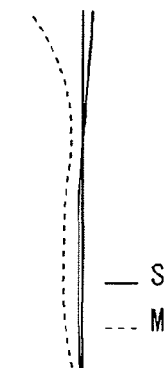
Figure 6D:
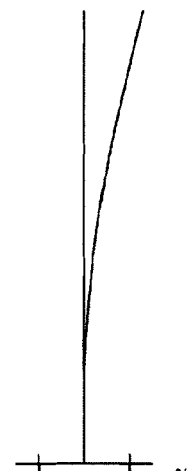

A finder optical system of each of the first through sixth numerical embodiments shown in FIGS. 1, 5, 9, 13, 17 and 21 is provided in a photographic apparatus, for example, in a single lens reflex camera. Although not shown in the drawings, a photographing lens system, through which an object-emanating light bundle passes, a movable mirror which reflects the object-emanating light bundle that has passed through the photographing lens system, and a focal plane plate, onto which an object image formed by the object-emanating light bundle that is reflected by the movable mirror is projected, are provided in that order from the object side at a forward position from the finder optical system with respect to the optical axis direction.

The finder optical system of each of the illustrated embodiments is provided with a penta roof prism PP, which serves as an image inverter optical member which inverts the object image that is formed through the photographing lens system to produce an erect object image, and an eyepiece lens system which forms an enlarged image of the erected object image (formed by the penta roof prism PP) at the eyepoint. The image inverter optical member is not limited to the penta roof prism PP; for example, various types of optical members having an image-inverting function, such as a Porro prism, etc., can be used. In the drawings, EP designates the eyepoint.

In the first and fourth through sixth numerical embodiments, the eyepiece lens system is configured of a negative first lens element LN1, a positive second lens element LP2, and a positive third lens element LP3, in that order from the penta roof prism PP (from the object side) toward the eyepoint EP.

In the first, fourth and sixth numerical embodiments, the first lens element LN1 is a biconcave negative lens element, and in the fifth numerical embodiment, the first lens element LN1 is a negative meniscus lens element having a convex surface on the object side. In the first, fourth and fifth numerical embodiments, the first lens element LN1 has an aspherical surface formed on each side thereof, and in the sixth numerical embodiment, an aspherical surface is formed only the surface on the object side (the surface on the eyepoint side is a spherical surface).

The second lens element LP2 is a biconvex positive lens element, and an aspherical surface is formed on the surface on the object side thereof. The second lens element LP2 is a diopter adjustment lens element which is moved along the optical axis direction during a diopter adjustment operation.

The third lens element LP3 is a positive meniscus lens element having a convex surface on the object side; the surface on the object side thereof is an aspherical surface.

In the second and third numerical embodiments, the eyepiece lens system is configured of a first lens element LN1, a positive second lens element LP2, and a negative third lens element LN3, in that order from the penta roof prism PP side (object side) toward the eyepoint.

The first lens element LN1 is a biconcave negative lens element, and an aspherical surface is formed on each side thereof.

The second lens element LP2 is a biconvex positive lens element, and an aspherical surface is formed on the object side thereof. The second lens element LP2 is a diopter adjustment lens element which is moved along the optical axis direction during a diopter adjustment operation.

The third lens element LN3 is a negative meniscus lens element having a convex surface on the object side; the surface on the object side thereof is an aspherical surface.

In the finder optical systems of the illustrated embodiments, the eyepiece lens system requires a simple arrangement, configured of the negative first lens element LN1, the positive second lens element LP2 having a biconvex shape, and the positive third lens element LP3 or the negative third lens element LN3 which each has a meniscus shape with a concave surface on the eyepoint side, in that order from the penta roof prism PP (object side) toward the eyepoint.

By providing a negative refractive power in the first lens element LN1 and setting the positive refractive power in the second lens element LP2 larger than the positive refractive power of the entire eyepiece lens system, and by carrying out a diopter adjustment by moving the second lens element LP2 in the optical axis direction thereof, the amount of movement of the second lens element LP2 (which serves as a diopter adjustment lens element) can be reduced compared to the case where a diopter adjustment is carried out by moving the entire eyepiece lens system.

Due to the positive third lens element LP3 or the negative third lens element LN3 having a meniscus shape with a concave surface on the eyepoint side and by appropriately setting the refractive power and the shape of the positive third lens element LP3 or the negative third lens element LN3, the observation magnification can be increased, a wide diopter adjustment range can be obtained with a small movement amount of the second lens element (diopter adjustment lens element) LP2, and various aberrations can be favorably corrected while achieving a superior optical quality.

Condition (1) specifies the ratio of the focal length of the entire eyepiece lens system at a diopter of −1 to the focal length of the positive third lens element LP3 or the negative third lens element LN3. By satisfying condition (1), a wide diopter adjustment range can be obtained with a small movement amount of the second lens element (diopter adjustment lens element) LP2, and various aberrations (especially astigmatism) can be favorably corrected while achieving a superior optical quality.

If the upper limit of condition (1) is exceeded, the positive refractive power of the positive third lens element LP3 becomes too large and the positive refractive power of the second lens element LP2 becomes small, so that the amount of movement of second lens element LP2 during a diopter adjustment operation increases.

If the lower limit of condition (1) is exceeded, the negative refractive power of the negative third lens element LN3 becomes too large and the positive refractive power of the second lens element LP2 increases, so that aberrations (especially astigmatism) during the diopter adjustment operation fluctuates greatly except when the diopter value is at −1.

Condition (2) specifies the refractive index at the d-line and the radius of curvature of the surface on the eyepoint side of the positive third lens element LP3 or the negative third lens element LN3. By satisfying condition (2), a high observation magnification can be obtained, and distortion can be favorably corrected so that a superior optical quality can be achieved.

If the upper limit of condition (2) is exceeded, the negative refractive power of the surface on the eyepoint side of the positive third lens element LP3 or the negative third lens element LN3 becomes too large, so that a large amount of distortion occurs.

If the lower limit of condition (2) is exceeded, the negative refractive power of the surface on the eyepoint side of the positive third lens element LP3 or the negative third lens element LN3 becomes too small and the focal length of the entire eyepiece lens system increases, so that a high observation magnification is unable to be achieved.

Condition (3) specifies the angular-magnification equivalent amount of the positive third lens element LP3 or the negative third lens element LN3. As specified in condition (1), the positive third lens element LP3 or the negative third lens element LN3 has a very weak positive or negative refractive power on either side of zero with respect to the refractive power of the entire eyepiece lens system. Accordingly, the positive third lens element LP3 or the negative third lens element LN3 has the prominent property of functioning as an afocal system. Furthermore, if the value of condition (1) is zero, the positive third lens element LP3 or the negative third lens element LN3 completely becomes an afocal system. In an afocal system, the diopter at the exit side is the square of the angular magnification ($\{\text{angular magnification}\}^2$) of the diopter at the incident side, and the lateral magnification does not change due to the refractive power thereof between zero. By utilizing these properties, it is possible to only increase the change in the diopter via the second lens element LP2. By satisfying condition (3), the lens thickness of the positive third lens element LP3 or the negative third lens element LN3 can be suppressed (i.e., be prevented from increasing in thickness) so that the eyepiece lens system can be miniaturized (reduced), and a wide diopter adjustment range can be obtained via a small movement amount (in the optical axis direction) of the second lens element (diopter adjustment lens element) LP2.

If the angular magnification of the positive third lens element LP3 or the negative third lens element LN3 increases to the extent of exceeding the upper limit of condition (3), the lens thickness of the positive third lens element LP3 or the negative third lens element LN3 increases, thereby enlarging the entire eyepiece lens system.

If the angular magnification of the positive third lens element LP3 or the negative third lens element LN3 decreases to the extent of exceeding the lower limit of condition (3), the movement amount of the second lens element LP2 during a diopter adjustment operation becomes large.

Condition (4) specifies the ratio of the focal length of the entire eyepiece optical system at a diopter of −1 to the focal length of the first lens element LN1. By satisfying condition (4), a high observation magnification can be obtained, and a wide diopter adjustment range can be obtained via a small movement amount (in the optical axis direction) of the second lens element (diopter adjustment lens element) LP2.

If the upper limit of condition (4) is exceeded, the negative refractive power of the first lens element LN1 becomes too small, so that the movement amount of the second lens element LP2 during a diopter adjustment operation becomes too large.

If the lower limit of condition (4) is exceeded, the negative refractive power of the first lens element LN1 becomes too large, so that a high observational magnification cannot be obtained.

Specific numerical embodiments 1 through 6 will be herein discussed. In the aberration diagrams and the tables, the d-line, g-line and C-line show aberrations at their respective wave-lengths; S designates the sagittal image, M designates the meridional image, ER designates the pupil diameter, f designates the focal length of the entire optical system (eyepiece lens system), B designates the exit angle (°), R designates the radius of curvature, d designates the lens thickness or distance between lenses, N(d) designates the refractive index at the d-line, and ν(d) designates the Abbe number with respect to the d-line. The unit used for the various lengths is defined in millimeters (mm). The values for the pupil diameter ER, the focal length f, the exit angle B, the eye relief, and the distance d between lens elements are shown in the order of the diopter of −1, −3 and +1.5.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12} \ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, etc., and 'x' designates the amount of sag.

Numerical Embodiment 1

FIGS. 1 through 4D and Tables 1 through 3 show a first numerical embodiment of the finder optical system, according to the present invention. FIG. 1 shows a lens arrangement of a finder optical system when the diopter value is −1. FIGS. 2A, 2B, 2C and 2D show various aberrations of the finder optical system when the diopter value is −1. FIGS. 3A, 3B, 3C and 3D show various aberrations of the finder optical system when the diopter value is −3.0. FIGS. 4A, 4B, 4C and 4D show various aberrations of the finder optical system when the diopter value is +1.5. Table 1 shows the lens surface data, Table 2 shows the aspherical surface data, and Table 3 shows various lens-system data.

The finder optical system of the first numerical embodiment is configured of a penta roof prism PP, which serves as an image inverter optical member which inverts the object image that is formed through a photographing lens system (not shown) to produce an erect object image, and an eyepiece lens system which forms an enlarged image of the erected object image (formed by the penta roof prism PP) at the eyepoint.

The eyepiece lens system is configured of a first lens element LN1 which is formed as a biconcave negative lens element, a second lens element LP2 which is formed as a biconvex positive lens element, and a third lens element LP3 which is formed as a positive meniscus lens element having a convex surface on the object side, in that order from the penta roof prism PP (from the object side) toward the eyepoint EP. The first lens element LN1 is provided with an aspherical surface on each side thereof. The second lens element LP2 is provided with an aspherical surface on the object side thereof. The third lens element LP3 is provided with an aspherical surface on the object side thereof. The second lens element LP2 is a diopter adjustment lens element which is moved in the optical axis direction during a diopter adjustment operation.

TABLE 1

SURFACE DATA

| Surf. No. | R | d | N(d) | ν(d) |
|---|---|---|---|---|
| 0 | Primary Imaging Plane | 2.550 | | |
| 1 | ∞ | 69.248 | 1.51633 | 64.1 |
| 2 | ∞ | 1.922 | | |
| 3* | −179.308 | 2.550 | 1.62133 | 25.0 |
| 4* | 32.944 | d4 | | |
| 5* | 42.869 | 5.600 | 1.49176 | 57.5 |
| 6 | −21.910 | d6 | | |
| 7* | 14.400 | 7.000 | 1.49176 | 57.5 |
| 8 | 12.128 | 18.700 | | |
| 9 | Eyepoint | | | |

The asterisk (*) designates an aspherical surface which is rotationally symmetrical with respect to the optical axis.

TABLE 2

ASPHERICAL SURFACE DATA (Coefficients not show are 0.00000E+00)

| Surf. No. | K | A4 | A6 | A8 |
|---|---|---|---|---|
| 3 | 0.0000 | 2.65900E−05 | −3.87400E−07 | 2.74000E−10 |
| 4 | 0.0000 | | −2.06700E−07 | |
| 5 | 0.0000 | −8.64600E−05 | 5.42000E−07 | −1.51500E−09 |
| 7 | 0.0000 | 4.02800E−05 | −1.53600E−07 | |

TABLE 3

VARIOUS LENS-SYSTEM DATA

| Diopter | −1 Diopter | −3.0 Diopter | +1.5 Diopter |
|---|---|---|---|
| ER | φ10 | φ10 | φ10 |
| f | 56.58 | 60.64 | 52.34 |
| B | 14.4 | 14.2 | 14.6 |
| Eye Relief | 18.7 | 18.7 | 18.7 |
| d4 | 2.935 | 1.595 | 4.555 |
| d6 | 2.297 | 3.637 | 0.677 |

Numerical Embodiment 2

FIGS. 5 through 8D and Tables 4 through 6 show a second numerical embodiment of the finder optical system, according to the present invention. FIG. 5 shows a lens arrangement of a finder optical system when the diopter value is −1. FIGS. 6A, 6B, 6C and 6D show various aberrations of the finder optical system when the diopter value is −1. FIGS. 7A, 7B, 7C and 7D show various aberrations of the finder optical system when the diopter value is −3.1. FIGS. 8A, 8B, 8C and 8D show various aberrations of the finder optical system when the diopter value is +1.5. Table 4 shows the lens surface data, Table 5 shows the aspherical surface data, and Table 6 shows various lens-system data.

The lens arrangement of the second numerical embodiment is the same as that of the first numerical embodiment except that a negative third lens element LN3 which is formed as a negative meniscus lens element having a convex surface on the object side is provided instead of the positive third lens element LP3.

TABLE 4

LENS SURFACE DATA

| Surf. No. | R | d | N(d) | ν(d) |
|---|---|---|---|---|
| 0 | Primary Imaging Plane | 2.550 | | |
| 1 | ∞ | 69.248 | 1.51633 | 64.1 |
| 2 | ∞ | 1.922 | | |
| 3* | −106.095 | 2.550 | 1.58547 | 29.9 |
| 4* | 34.388 | d4 | | |
| 5* | 34.960 | 5.600 | 1.52538 | 56.3 |
| 6 | −23.450 | d6 | | |
| 7* | 16.720 | 6.500 | 1.52538 | 56.3 |
| 8 | 13.096 | 18.700 | | |
| 9 | Eyepoint | | | |

The asterisk (*) designates an aspherical surface which is rotationally symmetrical with respect to the optical axis.

TABLE 5

ASPHERICAL SURFACE DATA (Coefficients not show are 0.00000E+00)

| Surf. No. | K | A4 | A6 | A8 |
|---|---|---|---|---|
| 3 | 0.0000 | 2.24000E−05 | −3.29000E−07 | 1.31000E−10 |
| 4 | 0.0000 | | −1.95100E−07 | |
| 5 | 0.0000 | −7.98700E−05 | 3.77900E−07 | −9.35000E−10 |
| 7 | 0.0000 | 4.39600E−05 | −6.32000E−08 | |

TABLE 6

VARIOUS LENS-SYSTEM DATA

| Diopter | −1 Diopter | −3.1 Diopter | +1.5 Diopter |
|---|---|---|---|
| ER | φ10 | φ10 | φ10 |
| f | 56.57 | 60.41 | 52.56 |
| B | 14.4 | 14.2 | 14.5 |
| Eye Relief | 18.7 | 18.7 | 18.7 |
| d4 | 2.935 | 1.595 | 4.555 |
| d6 | 2.297 | 3.637 | 0.677 |

Numerical Embodiment 3

Figure 9:
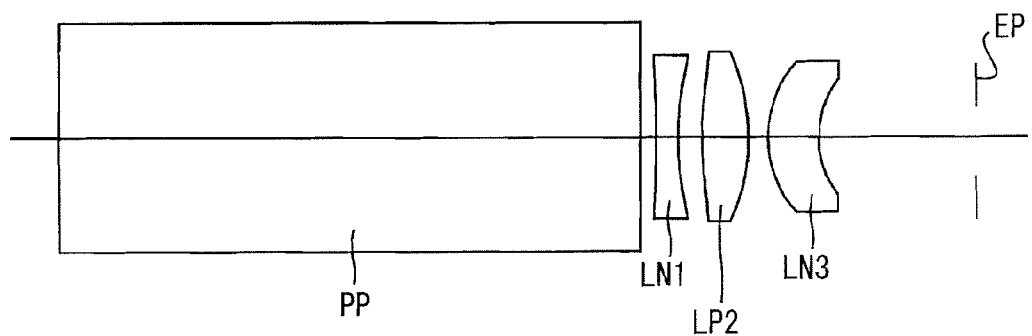
FIG. 9 shows a lens arrangement of a third numerical embodiment, according to the present invention, of a finder optical system when the diopter value is −1.
Figures 10A, 10B, 10C, 10D:
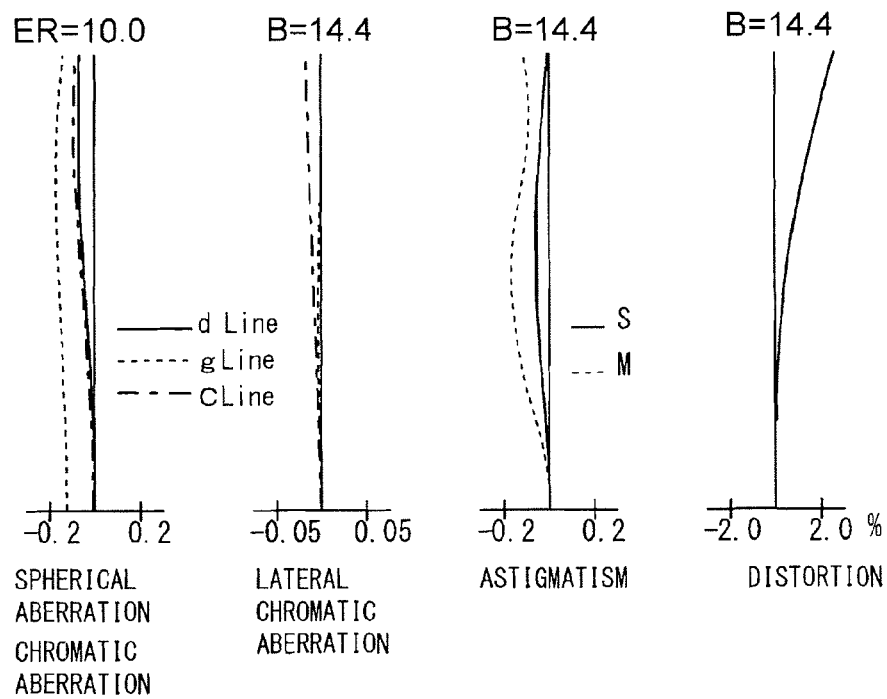
FIGS. 10A, 10B, 10C and 10D show various aberrations of the finder optical system, having the lens arrangement of FIG. 9, when the diopter value is −1.

FIGS. 9 through 12D and Tables 7 through 9 show a third numerical embodiment of the finder optical system, according to the present invention. FIG. 9 shows a lens arrangement of a finder optical system when the diopter value is −1. FIGS. 10A, 10B, 10C and 10D show various aberrations of the finder optical system when the diopter value is −1. FIGS. 11A, 11B, 11C and 11D show various aberrations of the finder optical system when the diopter value is −3.1. FIGS. 12A, 12B, 12C and 12D show various aberrations of the finder optical system when the diopter value is +1.5. Table 7 shows the lens surface data, Table 8 shows the aspherical surface data, and Table 9 shows various lens-system data.

The lens arrangement of the third numerical embodiment is the same as that of the second numerical embodiment.

TABLE 7

LENS SURFACE DATA

| Surf. No. | R | d | N(d) | ν(d) |
|---|---|---|---|---|
| 0 | Primary Imaging Plane | 2.550 | | |
| 1 | ∞ | 69.248 | 1.51633 | 64.1 |
| 2 | ∞ | 1.922 | | |
| 3* | −128.603 | 2.550 | 1.62133 | 25.0 |
| 4* | 34.892 | d4 | | |
| 5* | 38.154 | 5.600 | 1.52538 | 56.3 |
| 6 | −23.686 | d6 | | |
| 7* | 14.157 | 6.000 | 1.52538 | 56.3 |
| 8 | 11.571 | 18.700 | | |
| 9 | Eyepoint | | | |

The asterisk (*) designates an aspherical surface which is rotationally symmetrical with respect to the optical axis.

TABLE 8

ASPHERICAL SURFACE DATA (Coefficients not show are 0.00000E+00)

| Surf. No. | K | A4 | A6 | A8 |
|---|---|---|---|---|
| 3 | 0.0000 | 3.14400E−05 | −3.53400E−07 | 3.70000E−10 |
| 4 | 0.0000 | | −1.46100E−07 | |
| 5 | 0.0000 | −9.16800E−05 | 5.22900E−07 | −1.29800E−09 |
| 7 | 0.0000 | 4.51600E−05 | −1.03600E−07 | |

TABLE 9

VARIOUS LENS-SYSTEM DATA

| Diopter | −1 Diopter | −3.1 Diopter | +1.5 Diopter |
|---|---|---|---|
| ER | φ10 | φ10 | φ10 |
| f | 56.58 | 60.60 | 52.39 |
| B | 14.4 | 14.2 | 14.5 |
| Eye Relief | 18.7 | 18.7 | 18.7 |

TABLE 9-continued

VARIOUS LENS-SYSTEM DATA

| Diopter | −1 Diopter | −3.1 Diopter | +1.5 Diopter |
|---|---|---|---|
| d4 | 2.935 | 1.595 | 4.555 |
| d6 | 2.297 | 3.637 | 0.677 |

Numerical Embodiment 4

Figure 13:
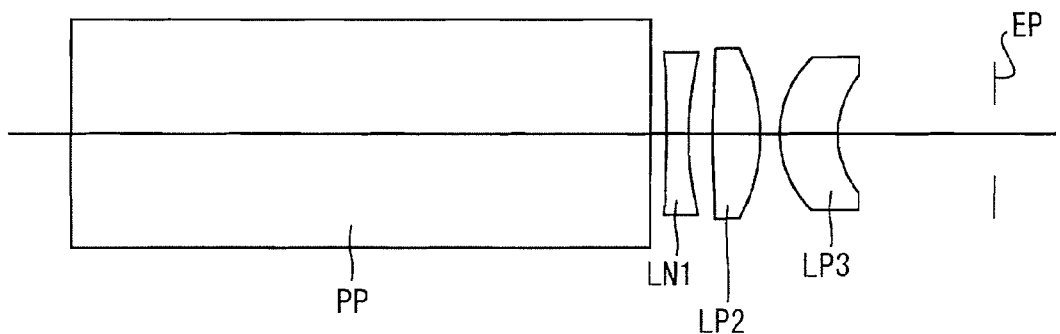
FIG. 13 shows a lens arrangement of a fourth numerical embodiment, according to the present invention, of a finder optical system when the diopter value is −1.
Figures 14A, 14B, 14C, 14D:
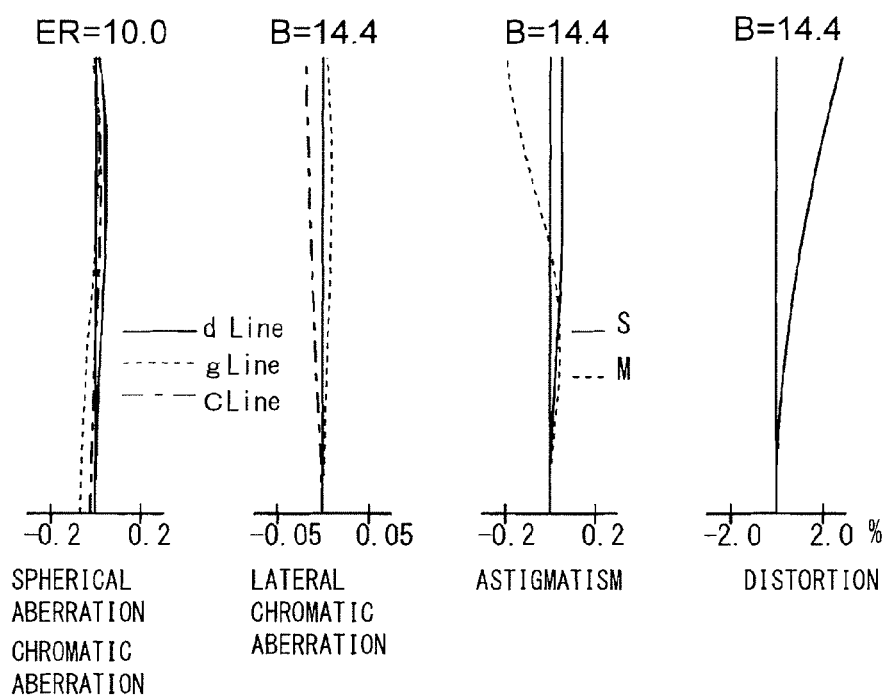
FIGS. 14A, 14B, 14C and 14D show various aberrations of the finder optical system, having the lens arrangement of FIG. 13, when the diopter value is −1.

FIGS. 13 through 16D and Tables 10 through 12 show a fourth numerical embodiment of the finder optical system, according to the present invention. FIG. 13 shows a lens arrangement of a finder optical system when the diopter value is −1. FIGS. 14A, 14B, 14C and 14D show various aberrations of the finder optical system when the diopter value is −1. FIGS. 15A, 15B, 15C and 15D show various aberrations of the finder optical system when the diopter value is −3.0. FIGS. 16A, 16B, 16C and 16D show various aberrations of the finder optical system when the diopter value is +1.5. Table 10 shows the lens surface data, Table 11 shows the aspherical surface data, and Table 12 shows various lens-system data.

The lens arrangement of the fourth numerical embodiment is the same as that of the first numerical embodiment.

TABLE 10

LENS SURFACE DATA

| Surf. No. | R | d | N(d) | ν(d) |
|---|---|---|---|---|
| 0 | Primary Imaging Plane | 2.550 | | |
| 1 | ∞ | 69.248 | 1.51633 | 64.1 |
| 2 | ∞ | 1.922 | | |
| 3* | −158.437 | 2.550 | 1.62133 | 25.0 |
| 4* | 34.555 | d4 | | |
| 5* | 73.126 | 5.600 | 1.52538 | 56.3 |
| 6 | −22.081 | d6 | | |
| 7* | 12.900 | 6.800 | 1.52538 | 56.3 |
| 8 | 11.233 | 18.700 | | |
| 9 | Eyepoint | | | |

The asterisk (*) designates an aspherical surface which is rotationally symmetrical with respect to the optical axis.

TABLE 11

ASPHERICAL SURFACE DATA (Coefficients not show are 0.00000E+00)

| Surf. No. | K | A4 | A6 | A8 |
|---|---|---|---|---|
| 3 | 0.0000 | 2.93100E−05 | −4.68500E−07 | 7.35000E−10 |
| 4 | 0.0000 | | −2.07300E−07 | |
| 5 | 0.0000 | −7.80300E−05 | 6.29400E−07 | −2.07800E−09 |
| 7 | 0.0000 | 3.23500E−05 | −2.82000E−07 | |

TABLE 12

VARIOUS LENS-SYSTEM DATA

| Diopter | −1 Diopter | −3.0 Diopter | +1.5 Diopter |
|---|---|---|---|
| ER | φ10 | φ10 | φ10 |
| f | 56.58 | 60.64 | 52.31 |
| B | 14.4 | 14.2 | 14.6 |
| Eye Relief | 18.7 | 18.7 | 18.7 |
| d4 | 2.935 | 1.595 | 4.555 |
| d6 | 2.297 | 3.637 | 0.677 |

Numerical Embodiment 5

Figure 17:
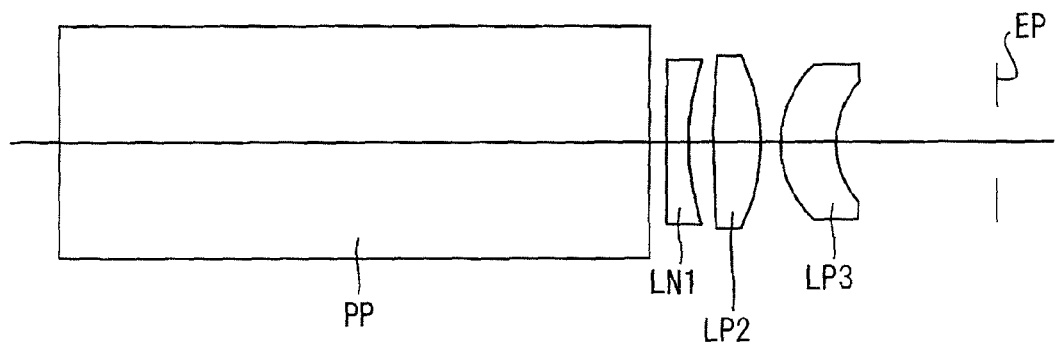
FIG. 17 shows a lens arrangement of a fifth numerical embodiment, according to the present invention, of a finder optical system when the diopter value is −1.
Figures 18A, 18B, 18C, 18D:
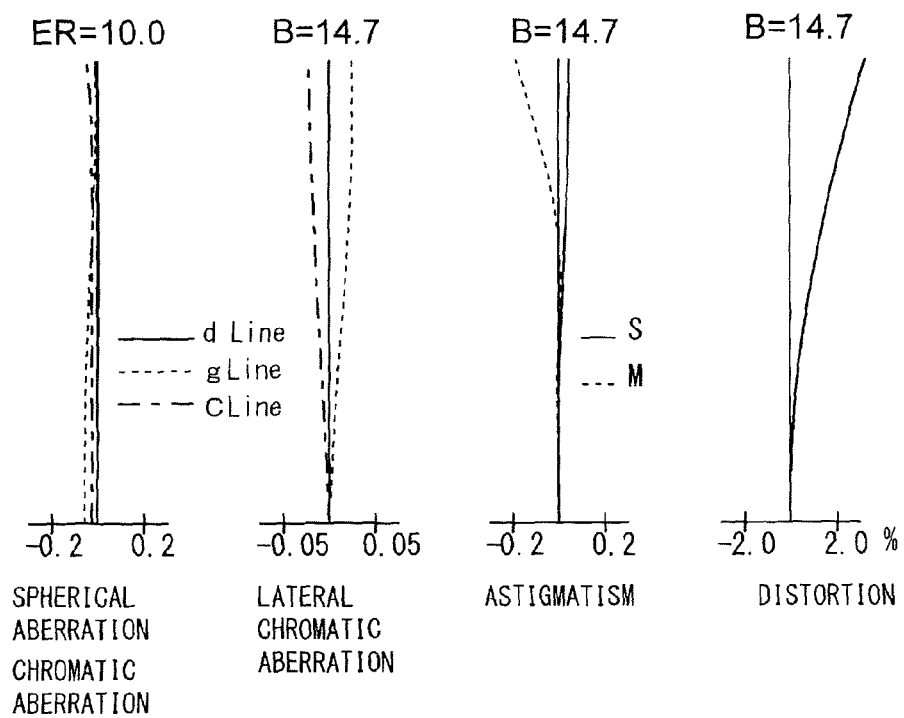
FIGS. 18A, 18B, 18C and 18D show various aberrations of the finder optical system, having the lens arrangement of FIG. 17, when the diopter value is −1.

FIGS. 17 through 20D and Tables 13 through 15 show a fifth numerical embodiment of the finder optical system, according to the present invention. FIG. 17 shows a lens arrangement of a finder optical system when the diopter value is −1. FIGS. 18A, 18B, 18C and 18D show various aberrations of the finder optical system when the diopter value is −1. FIGS. 19A, 19B, 19C and 19D show various aberrations of the finder optical system when the diopter value is −3.0. FIGS. 20A, 20B, 20C and 20D show various aberrations of the finder optical system when the diopter value is +1.5. Table 13 shows the lens surface data, Table 14 shows the aspherical surface data, and Table 15 shows various lens-system data.

The lens arrangement of the fifth numerical embodiment is the same as that of the first numerical embodiment except that the negative first lens element LN1 has been changed from a biconcave lens element to a meniscus lens element having a convex surface on the object side.

TABLE 13

LENS SURFACE DATA

| Surf. No. | R | d | N(d) | ν(d) |
|---|---|---|---|---|
| 0 | Primary Imaging Plane | 2.550 | | |
| 1 | ∞ | 69.248 | 1.51633 | 64.1 |
| 2 | ∞ | 1.922 | | |
| 3* | 389.992 | 2.550 | 1.62133 | 25.0 |
| 4* | 27.161 | d4 | | |
| 5* | 59.573 | 5.600 | 1.52538 | 56.3 |
| 6 | −22.565 | d6 | | |
| 7* | 12.585 | 6.500 | 1.52538 | 56.3 |
| 8 | 10.665 | 18.700 | | |
| 9 | Eyepoint | | | |

The asterisk (*) designates an aspherical surface which is rotationally symmetrical with respect to the optical axis.

TABLE 11

ASPHERICAL SURFACE DATA (Coefficients not show are 0.00000E+00)

| Surf. No. | K | A4 | A6 | A8 |
|---|---|---|---|---|
| 3 | 0.0000 | 3.83400E−05 | −5.18700E−07 | 7.36000E−10 |
| 4 | 0.0000 | | −2.50000E−07 | |
| 5 | 0.0000 | −9.79600E−05 | 7.65800E−07 | −2.36000E−09 |
| 7 | 0.0000 | 4.62900E−05 | −3.00000E−07 | |

TABLE 15

VARIOUS LENS-SYSTEM DATA

| Diopter | −1 Diopter | −3.0 Diopter | +1.5 Diopter |
|---|---|---|---|
| ER | φ10 | φ10 | φ10 |
| f | 55.41 | 59.12 | 51.49 |
| B | 14.7 | 14.6 | 14.9 |
| Eye Relief | 18.7 | 18.7 | 18.7 |
| d4 | 2.935 | 1.595 | 4.555 |
| d6 | 2.297 | 3.637 | 0.677 |

Numerical Embodiment 6

Figure 21:
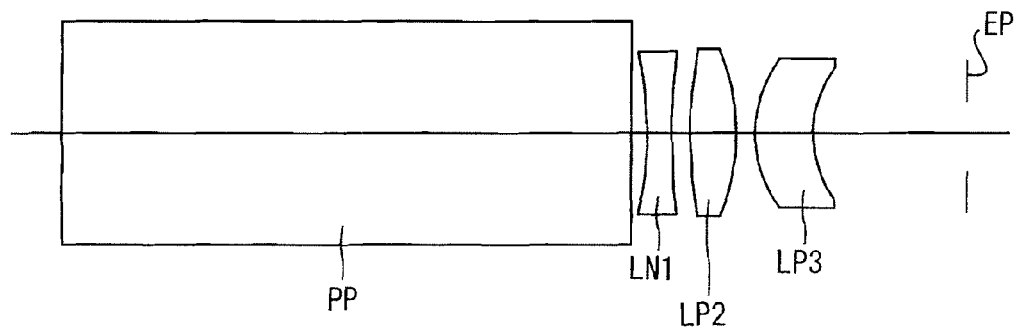
FIG. 21 shows a lens arrangement of a sixth numerical embodiment, according to the present invention, of a finder optical system when the diopter value is −1.
Figures 22A, 22B, 22C, 22D:
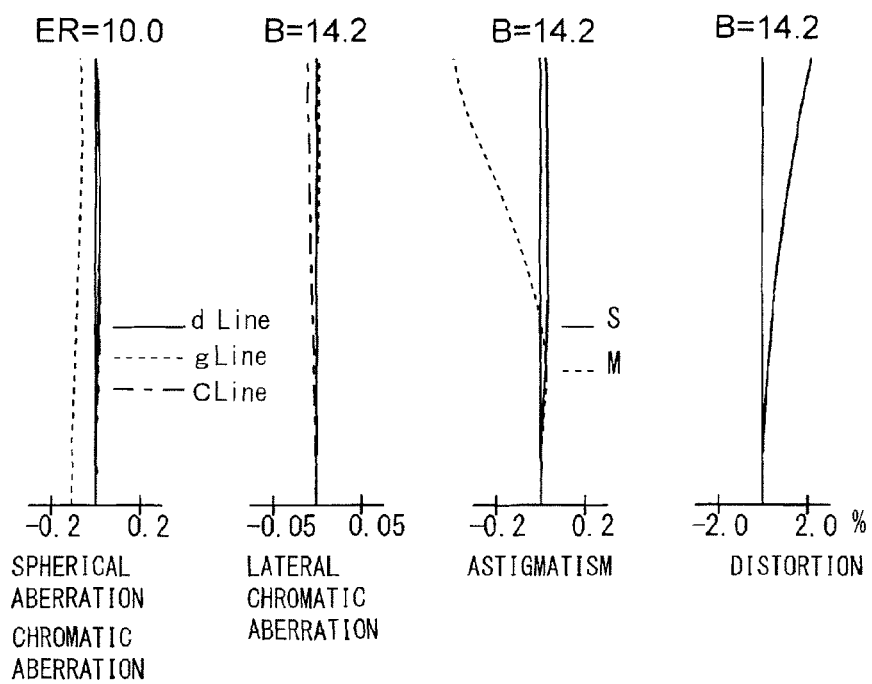
FIGS. 22A, 22B, 22C and 22D show various aberrations of the finder optical system, having the lens arrangement of FIG. 21, when the diopter value is −1.

FIGS. 21 through 24D and Tables 16 through 18 show a sixth numerical embodiment of the finder optical system, according to the present invention. FIG. 21 shows a lens arrangement of a finder optical system when the diopter value is −1. FIGS. 22A, 22B, 22C and 22D show various aberrations of the finder optical system when the diopter value is −1. FIGS. 23A, 23B, 23C and 23D show various aberrations of the finder optical system when the diopter value is −3.0. FIGS. 24A, 24B, 24C and 24D show various aberrations of the finder optical system when the diopter value is +1.5. Table 16 shows the lens surface data, Table 17 shows the aspherical surface data, and Table 18 shows various lens-system data.

The lens arrangement of the sixth numerical embodiment is the same as that of the first numerical embodiment except that only the surface on the object side of the negative first lens element LN1 has an aspherical surface (the surface on the eyepoint side has a spherical surface).

TABLE 16

LENS SURFACE DATA

| Surf. No. | R | d | N(d) | ν(d) |
|---|---|---|---|---|
| 0 | Primary Imaging Plane | 2.550 | | |
| 1 | ∞ | 69.248 | 1.51633 | 64.1 |
| 2 | ∞ | 1.922 | | |
| 3* | −40.160 | 3.000 | 1.62133 | 25.0 |
| 4 | 84.590 | d4 | | |
| 5* | 43.510 | 5.600 | 1.52538 | 56.3 |
| 6 | −25.210 | d6 | | |
| 7* | 15.220 | 7.000 | 1.52538 | 56.3 |
| 8 | 13.460 | 18.700 | | |
| 9 | Eyepoint | | | |

The asterisk (*) designates an aspherical surface which is rotationally symmetrical with respect to the optical axis.

TABLE 17

ASPHERICAL SURFACE DATA (Coefficients not show are 0.00000E+00)

| Surf. No. | K | A4 | A6 | A8 |
|---|---|---|---|---|
| 3 | 0.0000 | 2.40000E−05 | −2.18000E−07 | 5.39000E−10 |
| 5 | 0.0000 | −4.72000E−05 | 2.60000E−07 | −6.32000E−10 |
| 7 | 0.0000 | 8.64000E−06 | −7.60000E−08 | |

TABLE 18

VARIOUS LENS-SYSTEM DATA

| Diopter | −1 Diopter | −3.0 Diopter | +1.5 Diopter |
|---|---|---|---|
| ER | φ10 | φ10 | φ10 |
| f | 57.20 | 61.51 | 52.62 |
| B | 14.2 | 14.0 | 14.3 |
| Eye Relief | 18.7 | 18.7 | 18.7 |
| d4 | 2.234 | 0.894 | 3.864 |
| d6 | 2.298 | 3.638 | 0.668 |

The numerical values of each condition for each embodiment are shown in Table 19.

TABLE 19

| | Embod. 1 | Embod. 2 | Embod. 3 |
|---|---|---|---|
| Cond. (1) | 0.01 | −0.19 | −0.09 |
| Cond. (2) | 2.29 | 2.27 | 2.57 |
| Cond. (3) | 1.19 | 1.17 | 1.18 |
| Cond. (4) | −1.27 | −1.28 | −1.29 |
| | Embod. 4 | Embod. 5 | Embod. 6 |
| Cond. (1) | 0.14 | 0.07 | 0.10 |
| Cond. (2) | 2.65 | 2.73 | 2.23 |

TABLE 19-continued

| Cond. (3) | 1.21 | 1.21 | 1.18 |
|---|---|---|---|
| Cond. (4) | −1.25 | −1.18 | −1.32 |

As can be understood from Table 19, the first through sixth numerical embodiments satisfy conditions (1) through (4). Furthermore, as can be understood from the aberration diagrams, the various aberrations are favorably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A finder optical system comprising:
   an image inverter optical member, which inverts an object image to form an erected object image; and
   an eyepiece lens system which forms an enlarged image of the erected object image at an eyepoint,
   wherein said eyepiece lens system includes a first single negative lens element, a positive biconvex second lens element, and a meniscus third lens element having a concave surface on the eyepoint side, in order from the image inverter optical member side toward the eyepoint,
   wherein said second lens element is provided for movement in a direction along the optical axis of the eyepiece lens system to perform a diopter adjustment operation, and
   wherein the following conditions are satisfied:

$-0.2 < f/f3 < 0.2$ and $2.15 < f(L3n-1)/L3b < 3.00$ wherein
   f designates a focal length of the entire said eyepiece lens system at a diopter of −1,
   f3 designates a focal length of said third lens element,
   L3n designates a refractive index at a d-line of said third lens element, and
   L3b designates a radius of curvature of the surface on the eyepoint side of said third lens element.

2. The finder optical system according to claim 1, wherein the following condition is satisfied:

$1.15 < \{L3b/(L3n-1)+L3d/L3n\}/\{L3b/(L3n-1)\} < 1.30$
   wherein

L3d designates a lens thickness of said third lens element.

3. The finder optical system according to claim 2, wherein the following condition is satisfied:

$-1.5 < f/f1 < -1.1$ wherein f1 designates a focal length of said first lens element.

4. The finder optical system according to claim 1, wherein the following condition is satisfied:

$-1.5 < f/f1 < -1.1$, wherein f1 designates a focal length of said first lens element.

5. The finder optical system according to claim 1, wherein said first lens element includes an aspherical surface on at least the object side thereof, and wherein said second lens element includes an aspherical surface on the object side thereof, and said third lens element includes an aspherical surface on the object side thereof.

6. The finder optical system according to claim 1, said eyepiece lens system consists of said negative first lens element, said positive biconvex second lens element, and said meniscus third lens element.

7. The finder optical system according to claim 1, wherein the following condition is satisfied:

$2.15 < f(L3n-1)/L3b \leq 2.73$.

8. The finder optical system according to claim 7, each of said negative first lens element, said positive biconvex second lens element and said meniscus third lens element comprises a single lens element.

9. The finder optical system according to claim 1, wherein said first single negative lens element comprises a lens element closest to the image inverter optical member.

10. A finder optical system comprising:
an image inverter optical member, which inverts an object image to form an erected object image; and
an eyepiece lens system which forms an enlarged image of the erected object image at an eyepoint,
wherein said eyepiece lens system includes a first single negative lens element, a positive biconvex second lens element, and a meniscus third lens element having a concave surface on the eyepoint side, in order from the image inverter optical member side and toward the eyepoint,
wherein said second lens element is provided for movement in a direction along the optical axis of the eyepiece lens system to perform a diopter adjustment operation, and
wherein the following conditions are satisfied:

$-0.2 < f/f3 < 0.2$ and $1.15 < \{L3b/(L3n-1)+L3d/L3n\}/\{L3b/(L3n-1)\} < 1.30$ wherein f designates a focal length of the entire said eyepiece lens system at a diopter of −1,
f3 designates a focal length of said third lens element,
L3n designates a refractive index at a d-line of said third lens element,
L3b designates a radius of curvature of the surface on the eyepoint side of said third lens element, and
L3d designates a lens thickness of said third lens element.

11. The finder optical system according to claim 10, wherein said first lens element includes an aspherical surface on at least the object side thereof, and wherein said second lens element includes an aspherical surface on the object side thereof, and said third lens element includes an aspherical surface on the object side thereof.

12. The finder optical system according to claim 10, wherein the following condition is satisfied:

$-1.5 < f/f1 < -1.1$ wherein f1 designates a focal length of said first lens element.

13. The finder optical system according to claim 10, said eyepiece lens system consists of said negative first lens element, said positive biconvex second lens element, and said meniscus third lens element.

14. The finder optical system according to claim 10, wherein the following condition is satisfied:

$2.15 < f(L3n-1)/L3b \leq 2.73$.

15. The finder optical system according to claim 14, each of said negative first lens element, said positive biconvex second lens element and said meniscus third lens element comprises a single lens element.

16. A finder optical system comprising:
an image inverter optical member, which inverts an object image to form an erected object image; and
an eyepiece lens system which forms an enlarged image of the erected object image at an eyepoint,
wherein said eyepiece lens system includes a first single negative lens element, a positive biconvex second lens element, and a meniscus third lens element having a concave surface on the eyepoint side, in order from the image inverter optical member side and toward the eyepoint,
wherein a diopter adjustment operation is carried out by moving said second lens element is provided for movement in a direction along the optical axis of the eyepiece lens system to perform a diopter adjustment operation, and
wherein the following conditions are satisfied:

$-0.2 < f/f3 < 0.2$ and $-1.5 < f/f1 < -1.1$ wherein f designates a focal length of the entire said eyepiece lens system at a diopter of −1,
f1 designates a focal length of said first lens element, and
f3 designates a focal length of the third lens element.

17. The finder optical system according to claim 16, wherein said first lens element includes an aspherical surface on at least the object side thereof, and wherein said second lens element includes an aspherical surface on the object side thereof, and said third lens element includes an aspherical surface on the object side thereof.

18. The finder optical system according to claim 16, said eyepiece lens system consists of said negative first lens element, said positive biconvex second lens element, and said meniscus third lens element.

19. The finder optical system according to claim 16, wherein the following condition is satisfied:

$2.15 < f(L3n-1)/L3b \leq 2.73$.

20. The finder optical system according to claim 19, each of said negative first lens element, said positive biconvex second lens element and said meniscus third lens element comprises a single lens element.

* * * * *